United States Patent

[11] 3,628,110

| [72] | Inventor | William M. Casaday<br>Charlottesville, Va. |
|---|---|---|
| [21] | Appl. No. | 861,390 |
| [22] | Filed | Sept. 26, 1969 |
| [45] | Patented | Dec. 14, 1971 |
| [73] | Assignee | Sperry Rand Corporation |

[54] BRAKING CIRCUIT FOR BRUSHLESS DC MOTOR
5 Claims, 1 Drawing Fig.

[52] U.S. Cl. .................................................. 318/138,
318/211, 318/379, 318/685, 318/696
[51] Int. Cl. ................................................... H02p 3/12
[50] Field of Search ........................................... 318/138,
211, 212, 254, 373, 379–381, 612, 613, 685, 696

[56] References Cited
UNITED STATES PATENTS

| 2,627,059 | 1/1953 | Noodleman ................. | 318/211 |
| 3,309,592 | 3/1967 | Favre .......................... | 318/138 |
| 3,377,534 | 4/1968 | Hill ............................. | 318/138 |

Primary Examiner—Oris L Rader
Assistant Examiner—K. L. Crosson
Attorney—S. C. Yeaton ABSTRACT: A brushless DC motor (BDCM) of the type employing a permanent magnet rotor and a wound stator and in which each side of the power supply is connected to selected portions of the stator winding through a different group of commutating switches. Braking is accomplished by applying a braking signal which serves to close all of the switches in one group and open all of the switches in the other group of the commutating switches.

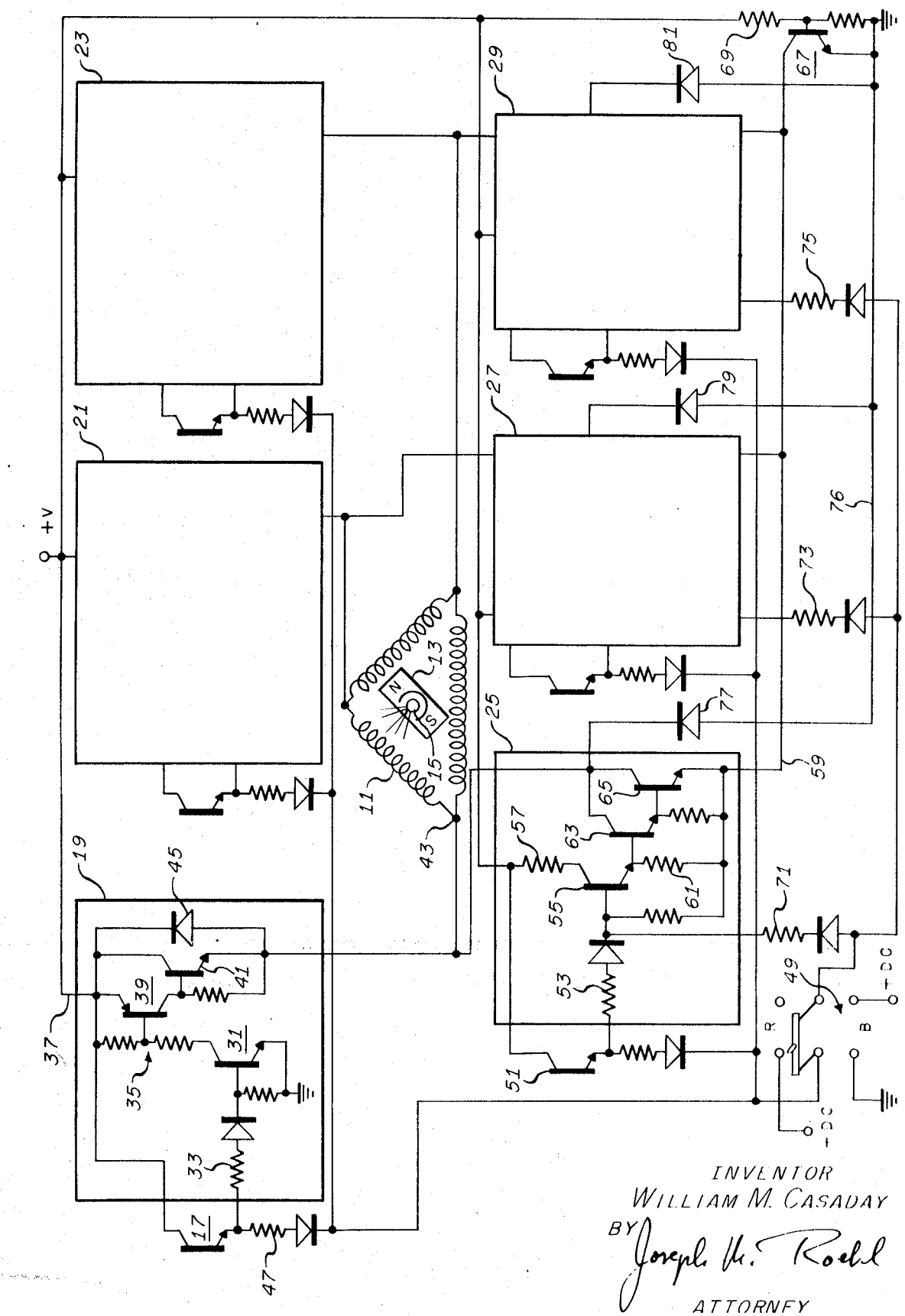

3,628,110

BRAKING CIRCUIT FOR BRUSHLESS DC MOTOR

BACKGROUND OF THE INVENTION

1. Field of the Invention

The invention relates to BDCM's and more specifically to dynamic braking circuits for such motors.

2. Description of the Prior Art

BDCM's employing braking circuits are known in the prior art. These motors, however, require braking circuits connected to the motor windings. The additional circuitry increases the bulk and complexity of the motors and at the same time decreases their reliability.

The problem is accentuated in the case of prior art motors having means for limiting the starting currents. Such motors require a separate current limiter in the braking circuit.

SUMMARY OF THE INVENTION

A BDCM of the type in which stator coils are selectively energized from a pair of power busses through commutating switches interconnecting the coils and the busses includes a dynamic braking circuit in which all of the switches connected to one bus can be simultaneously closed to provide a forward path for braking currents and in which reverse-biased diodes connected across these switches provide return paths for the braking circuits.

BRIEF DESCRIPTION OF THE DRAWING

The sole FIGURE is a circuit diagram, partly in block form, illustrating the presently preferred form of the invention.

DESCRIPTION OF THE PREFERRED EMBODIMENT

BDCM's are well known in the art. U.S. Pat. No. 3,377,534 entitled "Brushless DC Motor" issued to Roy K. Hill and assigned to the present assignee, for instance, illustrates one type of BDCM that may be used with the present invention.

As described in that patent, a wound stator such as the closed loop winding 11 in the accompanying figure may be energized so as to cause rotation of a permanent magnet rotor 13. In one embodiment of the invention described in that patent, an optical system is used for commutation. In this system, a light source on the axis of the rotor provides a rotating beam which is formed by a shield 15 having an aperture sufficiently wide to illuminate pairs of photocells. As the rotor rotates, the light beam scans pairs of photocells in sequence. In actual practice, such an arrangement also illuminates a third photocell for smaller angles of overlap. This feature is beneficial, however, since it insures starting at all rotor positions.

Referring again to the FIGURE, taps on the stator winding 11 are energized from one side of a power supply through a first group of commutating switches 19, 21 and 23. Return currents from the stator winding pass through a second group of commutating switches 25, 27 and 29 to the other side of the power supply.

The commutating switches are energized in response to individual sensors such as the sensor 17 associated with the commutating switch 19. Although the commutating switches are shown in a certain arrangement in the FIGURE in order to simplify the drawing, the sensors would be arranged so that pairs of sensors associated with switches 19–29, 21–25 and 23–27 would be illuminated in that order to maintain clockwise rotation as explained in the aforementioned patent.

The switches 21 and 23 are identical to the switch 19. Therefore, the switches 21 and 23 have been shown only in block form.

Similarly, the switches 27 and 29 are identical to the switch 25. Therefore, switches 27 and 29 are shown in block form.

Referring again to the switch 19, a sensor output signal from the photosensor 17 is applied to an input switching transistor 31 through a resistor and diode combination 33. The transistor 31 is energized through a pair of resistors 35 and a first bus 37 from the positive side of a power supply. When a signal is received from the illuminated photosensor 17, the sensor output signal drives the input transistor 31 into conduction. This, in turn, drives an intermediate transistor 39 into conduction so as to turn on the output switching transistor 41 and permit current to flow to the tap 43 on the stator winding. A reverse-biased diode 45 is shunted across the transistor 41 so as to protect this transistor against spurious transients. The photo transistor 17 is also connected through a diode-resistor combination 47 to a source of braking signals 49. This source has been shown functionally as a double-pole double-throw switch. However, in actual situations, this source would normally be a logic circuit suitable for supplying running and braking signals as required.

During the running mode of operation, the switch is thrown in the upward direction. This applies a positive voltage to the circuit 47 associated with the photosensor 17 so as to back bias the diode in the circuit 47. Under these conditions, the photosensor 17 to able to provide output signals to the commutating switch 19 whenever that photosensor is illuminated.

In the braking mode, the switch in the circuit 49 is thrown downward so as to connect the circuit 47 to ground. In this condition, any output signals from the photosensor 17 are diverted to ground and thus have no effect on the commutating switch 19. The transistors in the circuit 19 are normally biased to cut off. Thus, in the braking mode, the transistor-switching circuit of the switch 19 is disabled and cannot provide any current to the stator winding 11.

The commutating switch 25 in the second group of commutating switches is energized from a photosensor 51. Sensor output signals from the photosensor 51 are applied through a resistor-diode combination 53 to the base electrode of an input switching transistor 55. This transistor, as well as the photosensor 51, is coupled to the first bus 37 through a resistor 57 and to a line 59 through a resistor 61. The emitter of the input transistor 55 drives an intermediate transistor 63, which in turn, drives an output switching transistor 65. The collector of the transistor 65 is connected to a tap 43 on the stator winding 11. The emitter of the transistor 65 is connected to the line 59.

A current limiter 67 may be employed where large starting currents are expected. The transistor of the limiter 67 has its base connected to the bus 37 through a series resistor 69. The base is also connected to a second bus leading to the grounded side of the power supply.

Such a limiting circuit, although not part of the invention, is commonly used in order to protect components in the motor where starting currents may be excessive. In a motor normally drawing 3 amperes, starting currents of 10–12 amperes may be experienced. Such high starting currents would demagnetize the permanent magnet and exceed the transistor ratings. A limiter in such a situation might be designed to limit the starting current to about 4 amperes.

The line 59 is connected to the limiter transistor 67. The base of the input transistor 55 in the commutating switch 25 is connected to the source of braking signals 49 through an auxiliary means including the diode-resistor combination 71. When the switch in the circuit 49 is in the running position, no voltage is applied to the transistor 55. Under these conditions, sensor output signals from the photosensor 51 can actuate the transistor-switching circuit.

When the switch in the circuit 49 is thrown downward into the braking position, however, a positive voltage is applied through the auxiliary means 71 to the base of the transistor 55. This automatically applies a positive voltage to the transistor 55 which saturates this transistor and turns on the transistor-switching circuit of the switch 25. Thus, regardless of the operating state of the photosensor 51, the commutating switch 25 will conduct current from the stator winding 11 through the current-limiting circuit 67 during the braking mode of operation.

During the braking mode of operation, the commutating switches 21 and 23 are maintained in the turned-off condition since a braking voltage is applied to the sensors associated with the switches 21 and 23 at the same time that the braking voltage is applied to the sensor 17 of the commutating switch 19. During the braking mode of operation, similar voltages are also applied to the photosensor 51 of the commutating switch 25 as well as the photosensors associated with the switch 27 and 29. However, during the braking mode of operation, a positive signal is applied through the auxiliary means 71 and the corresponding auxiliary means 73 and 75 associated with the commutating switched 27 and 29, respectively, so that these three commutating switches are maintained in the turned-on or conducting state throughout the braking mode.

In accordance with the well-known principles of dynamic braking, as the rotor 13 rotates after power from the supply has been interrupted, the motor acts as a generator and currents induced in the windings can be used to absorb the rotational energy and bring the rotor to a stop. Currents thus generated cannot flow through the first group of commutating switches since these switches are maintained in the turned-off condition during braking.

Currents thus generated, however, can flow through any of the switches 25, 27 and 29. These currents pass through the output-switching transistors in the respective commutating switches to the line 59, through the current-limiting transistor 67, and a line 76. They are then returned to the stator winding through the reverse-biased diodes 77, 79 and 81.

By using the circuit of the present invention, braking means may be readily incorporated into conventional commutating circuits. There is no need for elaborate auxiliary equipment. An existing current-limiting circuit, for instance, may be used with the present braking system without the need for additional circuitry.

In special situations, such as circuits utilizing pulse width modulation, for instance, the braking circuit may be used since it allows motor control by the pulse width modulation technique to function during braking as well as running modes.

I claim:

1. A braking circuit for a BDCM of the type including a stator winding, a permanent magnet rotor, rotor position sensing means, and first and second groups of commutating switches responsive to the output of said sensing means for sequentially connecting sections of said stator winding to first and second power busses, respectively, said braking circuit comprising means to receive a braking signal, means for simultaneously opening all switches in said first group while simultaneously closing all switches in said second group in response to a braking signal.

2. The apparatus of claim 1 wherein each of the commutating switches in said groups includes a transistor-switching circuit responsive to an individual position sensor, and wherein said switching circuit further includes an output transistor connected serially between said stator winding and one of said power busses, each of said output transistors being normally biased to cut off and further connected so as to be turned on in response to a signal from the associated position sensor.

3. The apparatus of claim 2 further including means to disable each of said position sensors in response to a braking signal and auxiliary means to turn on the output transistors in said second group of switches regardless of the operating condition of the associated position sensors.

4. The apparatus of claim 3 in which each position sensor is a photosensor coupled to provide a sensor output signal to the corresponding transistor-switching circuit when the photosensor is illuminated, said braking circuit further including means to divert a sensor output signal from the corresponding transistor-switching circuit in response to a braking signal.

5. The apparatus of claim 3 in which said auxiliary means includes means to saturate each of the output transistors in the transistor-switching circuit of said second group in response to a braking signal.

* * * * *